(12) United States Patent
Mashiki et al.

(10) Patent No.: US 6,321,716 B1
(45) Date of Patent: Nov. 27, 2001

(54) NEGATIVE PRESSURE CONTROL APPARATUS FOR ENGINE MOUNTED IN VEHICLE

(75) Inventors: Zenichiro Mashiki, Nisshin; Jun Harada, Toyota, both of (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/605,785

(22) Filed: Jun. 27, 2000

(30) Foreign Application Priority Data

Jul. 2, 1999 (JP) .................................................. 11-189003
Oct. 28, 1999 (JP) .................................................. 11-307655
Mar. 22, 2000 (JP) .................................................. 12-079699

(51) Int. Cl.⁷ ..................................................... F02B 17/00
(52) U.S. Cl. ........................................... 123/295; 123/377
(58) Field of Search .................................. 123/295, 377, 123/198 D; 477/202, 203

(56) References Cited

U.S. PATENT DOCUMENTS

| | | | |
|---|---|---|---|
| 5,846,164 | * 12/1998 | Harada | 477/205 |
| 5,950,594 | * 9/1999 | Mizuno | 123/295 |
| 5,950,595 | * 9/1999 | Yoshioka et al. | 123/295 |
| 6,017,100 | * 6/2000 | Mizuno et al. | 123/295 |
| 6,065,443 | * 5/2000 | Mizuno et al. | 123/295 |
| 6,095,116 | * 8/2000 | Matsushita et al. | 123/295 |
| 6,223,717 | * 5/2001 | Wiemers | 123/295 |
| 6,257,218 | * 7/2001 | Takagi et al. | 123/295 |

FOREIGN PATENT DOCUMENTS 10-151970  6/1998  (JP).
10-167047  6/1998  (JP).

* cited by examiner

Primary Examiner—Erick Solis
(74) Attorney, Agent, or Firm—Oliff & Berridge, PLC

(57) ABSTRACT

A brake booster is actuated based on negative pressure in an intake passage. When an engine is operating in the stratified charge combustion, an ECU decreases the throttle opening size to lower the pressure in the intake passage if the pressure in the brake booster, or a booster working pressure, is higher than a demanded value. When the booster working pressure is lower than the demanded value, the ECU increases the throttle opening size as the difference between the booster working pressure and the demanded value increases. Therefore, when the difference between the booster working pressure and the demanded value is small, the booster working pressure is rapidly lowered if the booster working pressure increases above the demanded value. When the difference between the booster working pressure and the demanded value is great, the pumping loss of the engine is decreased.

22 Claims, 11 Drawing Sheets

NEGATIVE PRESSURE CONTROL APPARATUS FOR ENGINE MOUNTED IN VEHICLE

BACKGROUND OF THE INVENTION

The present invention relates generally to a negative pressure control apparatus for an engine mounted in a vehicle.

In general, vehicle engines are powered by the combustion of a mixture of air supplied into a combustion chamber via the intake passage and fuel injected from the associated fuel injection valve. Located in the intake passage of the engine is a throttle valve for regulating the amount of air supplied to the combustion chamber. The engine power is controlled by regulating the amount of air supplied to the combustion chamber by adjusting the position, or angle, of the throttle valve.

Recently, an engine that switches the combustion mode in accordance with the running conditions of the engine to gain fuel efficiency and produce a high level of engine power has been proposed and put to practical use.

This type of engine gains adequate engine power by carrying out "homogeneous charge combustion," in which a homogeneous air-fuel mixture is burned. Homogeneous combustion is employed during high-speed or heavy-load operations. Homogeneous charge combustion is accomplished by homogeneously mixing the fuel injected into the combustion chamber with the air in the combustion chamber during the suction stroke of the engine and igniting the resultant air-fuel mixture with the ignition plug.

During low-speed or light-load operations, which do not require as much engine power, "stratified charge combustion" is executed, which increases the fuel concentration about the ignition plug to improve the ignitability and to make the average air-fuel ratio more lean than the stoichiometric air-fuel ratio, which reduces fuel consumption. Stratified charge combustion is carried out by causing fuel, which is injected into the combustion chamber during the compression stroke, to strike an indentation in the head of the associated piston such that the fuel gathers around the ignition plug. The mixture of the gathered fuel and the air in the combustion chamber is then ignited with the ignition plug. During stratified charge combustion, the throttle valve opening is regulated to be wider than that of homogeneous charge combustion to increase the average air-fuel ratio of the air-fuel mixture. This reduces the engine pumping loss.

Switching of the combustion mode of the engine between homogeneous charge combustion and stratified charge combustion in accordance with the running conditions of the engine improves fuel efficiency and provides appropriate engine power for the circumstances.

In an engine mounted in a vehicle, a brake booster, which reduces the force required to operate the brake pedal, is a negative-pressure, or vacuum, driven apparatus. That is, the brake booster operates using the vacuum pressure generated in the intake system. The brake booster stores vacuum generated in the intake system of the engine as the booster pressure, or working pressure, and operates based on the booster pressure. The booster pressure may be relied on to boost the brake force in an engine that executes stratified charge combustion. However, as mentioned previously, the throttle valve opening is wider during stratified charge combustion as compared with that in homogeneous charge combustion, and consequently, the negative pressure generated in the intake system of the engine approaches atmospheric pressure. Therefore, the booster pressure needed to operate the brake booster may not be available.

One conventional solution to this problem is to temporarily choke the throttle opening with the throttle valve to produce the booster pressure needed to operate the brake booster. The vacuum control apparatuses disclosed in, for example, Japanese Unexamined Patent Publication No. 10-151970 and Japanese Unexamined Patent Publication No. 10-167047 perform choking to create additional vacuum. The vacuum control apparatuses described in these publications choke the throttle when the booster pressure is inadequate to operate the brake booster. Choking the throttle reduces the pressure in the intake passage, thus producing the booster pressure needed to operate the brake booster.

When performing the choking control procedure, there is a delay between the time at which the throttle is choked and the time of the consequential change in the vacuum produced in the intake system. Thus, the time needed to produce the required booster pressure is extended by the response delay time. However, rapid vacuum production is needed to provide the required booster pressure as quickly as possible to improve the braking performance of the vehicle. According to the prior art, therefore, the opening of the throttle valve is relatively small during the normal stratified charge combustion to reduce the delay. Positioning the throttle valve this way during stratified charge combustion, that is, slightly closing the throttle during stratified charge combustion, causes the booster pressure to quickly reach the required value when the choking procedure is performed.

While slightly closing the throttle valve during normal stratified charge combustion hastens the production of the booster pressure needed to operate the brake booster, this scheme increases the engine pumping loss during normal stratified charge combustion, which increases fuel consumption.

SUMMARY OF THE INVENTION

Accordingly, it is an object of the present invention to provide a negative pressure control apparatus for a vehicle engine that quickly produces the working pressure needed for a negative-pressure driven apparatus such as a brake booster while reducing engine pumping loss.

To achieve the above object, the present invention provides a negative pressure control apparatus for an engine that produces power by burning a mixture of air and fuel in a combustion chamber. An intake passage is connected to the combustion chamber. Negative pressure is produced in the intake passage when air is drawn into the combustion chamber from the intake passage. A negative pressure driven device is actuated by a working pressure, which is produced by the negative pressure in the intake passage. A pressure adjusting mechanism adjusts the pressure in the intake passage. A controller controls the pressure adjusting mechanism. When the working pressure is higher than a predetermined demanded value, the controller causes the pressure adjusting mechanism to lower the pressure in the intake passage to lower the working pressure. When the working pressure is lower than the demanded value, the controller, through the pressure adjusting mechanism, raises the pressure in the intake passage as the difference between the working pressure and the demanded value increases.

The present invention also provides a method for controlling negative pressure of an engine that produces power by burning a mixture of air and fuel in a combustion chamber. The method includes: producing negative pressure in an intake passage when air is drawn into the combustion chamber from the intake passage; actuating a negative pressure driven device by a working pressure, which is produced by the negative pressure in the intake passage; lowering the pressure in the intake passage and the working pressure when the working pressure is higher than a predetermined demanded value; and increasing the pressure in the intake passage as the difference between the working pressure and the demanded value increases when the working pressure is lower than the demanded value.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawing in which.

DETAILED DESCRIPTION OF THE PREFERRED EMBODIMENTS

First Embodiment

The first embodiment of the present invention, which is adapted for a direct injection vehicle gasoline engine 11, will now be described referring to FIGS. 1 through 5.

Figure 1:
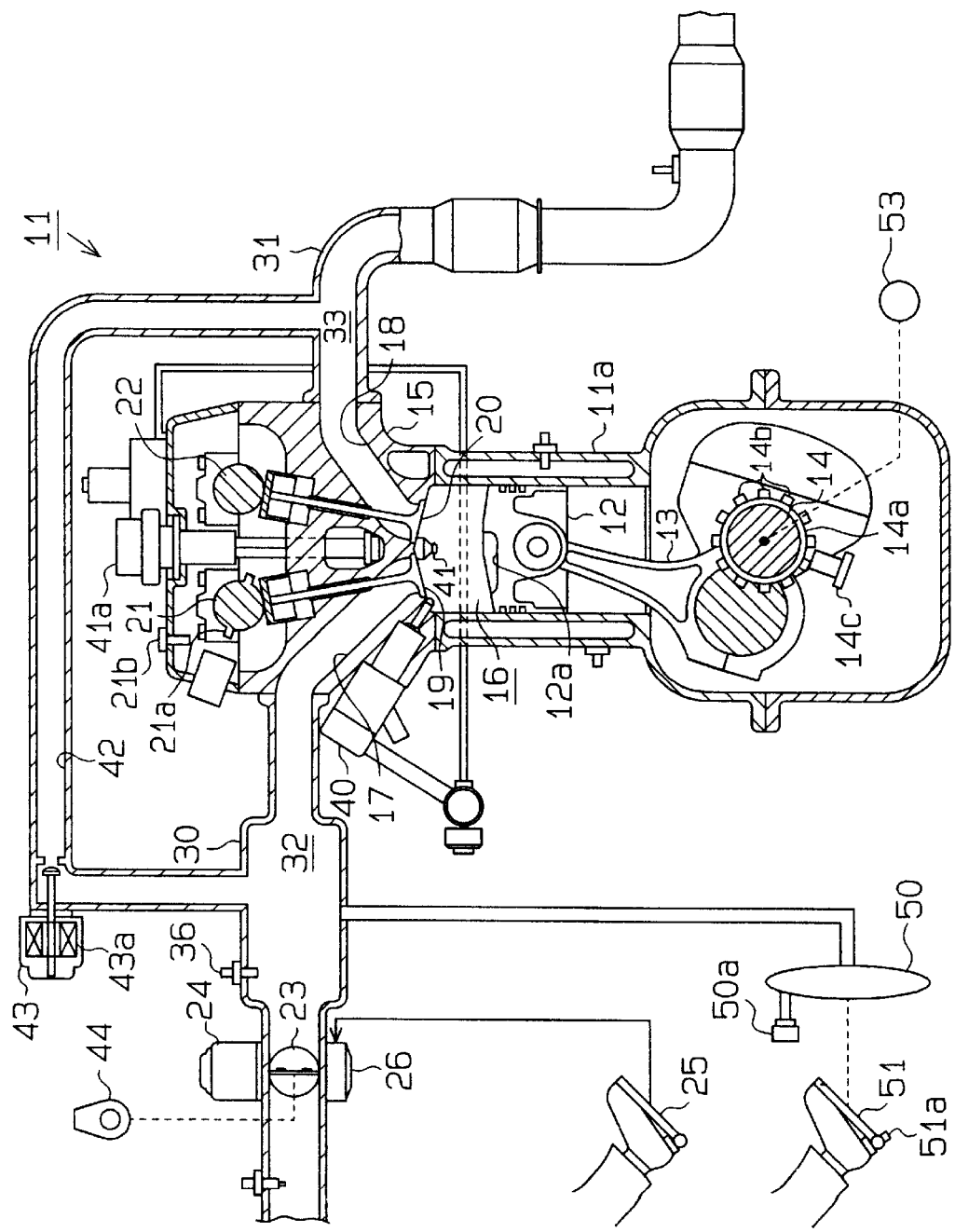
FIG. 1 is a diagrammatic cross-sectional view of an engine including a negative pressure control apparatus according to a first embodiment.

As shown in FIG. 1, the vehicle engine 11 has a plurality of pistons 12 (only one shown in FIG. 1) provided in its cylinder block 11a. Formed at the head of each piston 12 is an indentation 12a, which is used during stratified charge combustion. The pistons 12 are connected via a connecting rod 13 to a crankshaft 14, which is an output shaft. The connecting rod 13 converts the reciprocation of the pistons 12 to the rotation of the crankshaft 14. When the rotation of the crankshaft 14 is transmitted to the wheels of the vehicle through a transmission, the wheels rotate and the vehicle runs. The speed of the vehicle is detected by a vehicle speed sensor 53.

A signal rotor 14a is attached to the crankshaft 14. A plurality of projections 14b are provided on the outer surface of the signal rotor 14a at equal angular positions. A crank position sensor 14c is provided adjacent to the signal rotor 14a. As the crankshaft 14 rotates and the projections 14b of the signal rotor 14a pass by the crank position sensor 14c, the sensor 14c outputs a pulse detection signal corresponding to the passing of each projection 14b.

A cylinder head 15 is provided on the upper end of the cylinder block 11a, and a combustion chamber 16 is formed between the cylinder head 15 and each piston. The combustion chamber 16 is connected to an intake port 17 and an exhaust port 18, which are provided in the cylinder head 15. The intake ports 17 and exhaust ports 18 are provided with intake valves 19 and an exhaust valves 20, respectively.

As shown in FIG. 1, rotatably supported on the cylinder head 15 are an intake camshaft 21 and an exhaust camshaft 22, which respectively open and close the intake valves 19 and exhaust valves 20. The intake and exhaust camshafts 21 and 22 are connected to the crankshaft 14 by a timing belt and gears (neither illustrated) or the like, so that camshafts 21, 22 are driven by the crankshaft 14. When the intake camshaft 21 turns, the intake valves 19 are opened or closed, thus connecting or disconnecting the intake ports 17 with the combustion chambers 16. When the exhaust camshaft 22 turns, the exhaust valves 20 are opened or closed, thus connecting or disconnecting the exhaust port 18 with the combustion chamber 16.

Adjacent to the intake camshaft 21 in the cylinder head 15 is a cam position sensor 21b, which detects projections 21a provided on the outer surface of the shaft 21 and outputs corresponding detection signals. As the intake camshaft 21 turns, the projections 21a of the shaft 21 pass by the cam position sensor 21b. Thus, the cam position sensor 21b outputs a detection signal at predetermined intervals in accordance with the passing of the projections 21a.

An intake pipe 30 and an exhaust pipe 31 are respectively connected to the intake port 17 and exhaust port 18. Inside the intake pipe 30 and the intake port 17 is an intake passage 32, and inside the exhaust pipe 31 and the exhaust port 18 is an exhaust passage 33. A throttle valve 23 is provided at the upstream portion of the intake passage 32. The throttle valve 23 is rotated for angle adjustment by a throttle motor 24 which is a DC motor. The position, or angle, of the throttle valve 23 is detected by a throttle position sensor 44.

The driving of the throttle motor 24 is controlled based on the depression amount of an accelerator pedal 25 provided in the passenger compartment of the vehicle. Specifically, when the driver of the vehicle steps on or off the pedal 25, the accelerator depression amount is detected by a pedal position sensor 26 and the throttle motor 24 is controlled based on a detection signal from the sensor 26. The regulation of the angle of the throttle valve 23 based on control of the throttle motor 24 changes the opening size of the intake passage 32, thus adjusting the amount of air supplied to the combustion chamber 16.

A vacuum sensor 36, which detects the pressure in the intake passage 32, is provided in the intake passage 32 downstream of the throttle valve 23. The vacuum sensor 36 outputs a detection signal corresponding to the detected pressure in the intake passage 32.

A brake booster 50 is connected with a negative pressure passage 49 to the intake passage 32 downstream of the throttle valve 23. The brake booster 50 reduces the force required by the driver to depress a brake pedal 51 of the vehicle. The brake booster 50 is actuated by using the negative pressure produced in the intake passage 32 when the engine 11 is running. Specifically, the negative pressure in the intake passage 32 draws air from the brake booster 50 via the negative pressure passage 49, and this causes the negative pressure produced in the brake booster 50 to be stored as a booster working pressure PV. The brake booster 50 is actuated based on the differential pressure (brake pressure PBK) between atmospheric pressure and the booster working pressure PV.

The booster working pressure PV is detected by a booster pressure sensor 50a. The brake pedal 51 is provided with a brake switch 51a for detecting whether the brake pedal 51 is depressed. It is possible to determine the degree of depression of the brake pedal 51 based on a signal from this brake switch 51a.

As shown in FIG. 1, the cylinder head 15 is further provided with a fuel injection valve 40 for injecting fuel in the combustion chamber 16 and an ignition plug 41, which ignites an air-fuel mixture in the combustion chamber 16. The timing for igniting the air-fuel mixture by the ignition plug 41 is adjusted by an igniter 41a provided above the ignition plug 41.

When fuel is injected into the combustion chamber 16 from the fuel injection valve 40, the fuel is blended with the air supplied to the combustion chamber 16 via the intake passage 32, thereby yielding an air-fuel mixture in the combustion chamber 16. The air-fuel mixture in the combustion chamber 16 is ignited by the ignition plug 41 and burned. The burned air-fuel mixture is sent to the exhaust passage 33 as exhaust gas.

The portion of the intake passage 32 downstream of the throttle valve 23 is connected to the exhaust passage 33 via an exhaust gas recirculation (EGR) passage 42. An EGR valve 43 having a stepping motor 43a is located in the EGR passage 42. The position, or opening size, of the EGR valve 43 is regulated by controlling the stepping motor 43a. The position of the EGR valve 43 adjusts the amount of exhaust gas (EGR amount) that is recirculated to the intake passage 32 via the exhaust passage 33. When exhaust gas is recirculated to the intake passage 32, the temperature in the combustion chamber 16 falls, thus suppressing the production of nitrogen oxide (NOx), so that the NOx emission is reduced.

Figure 2:
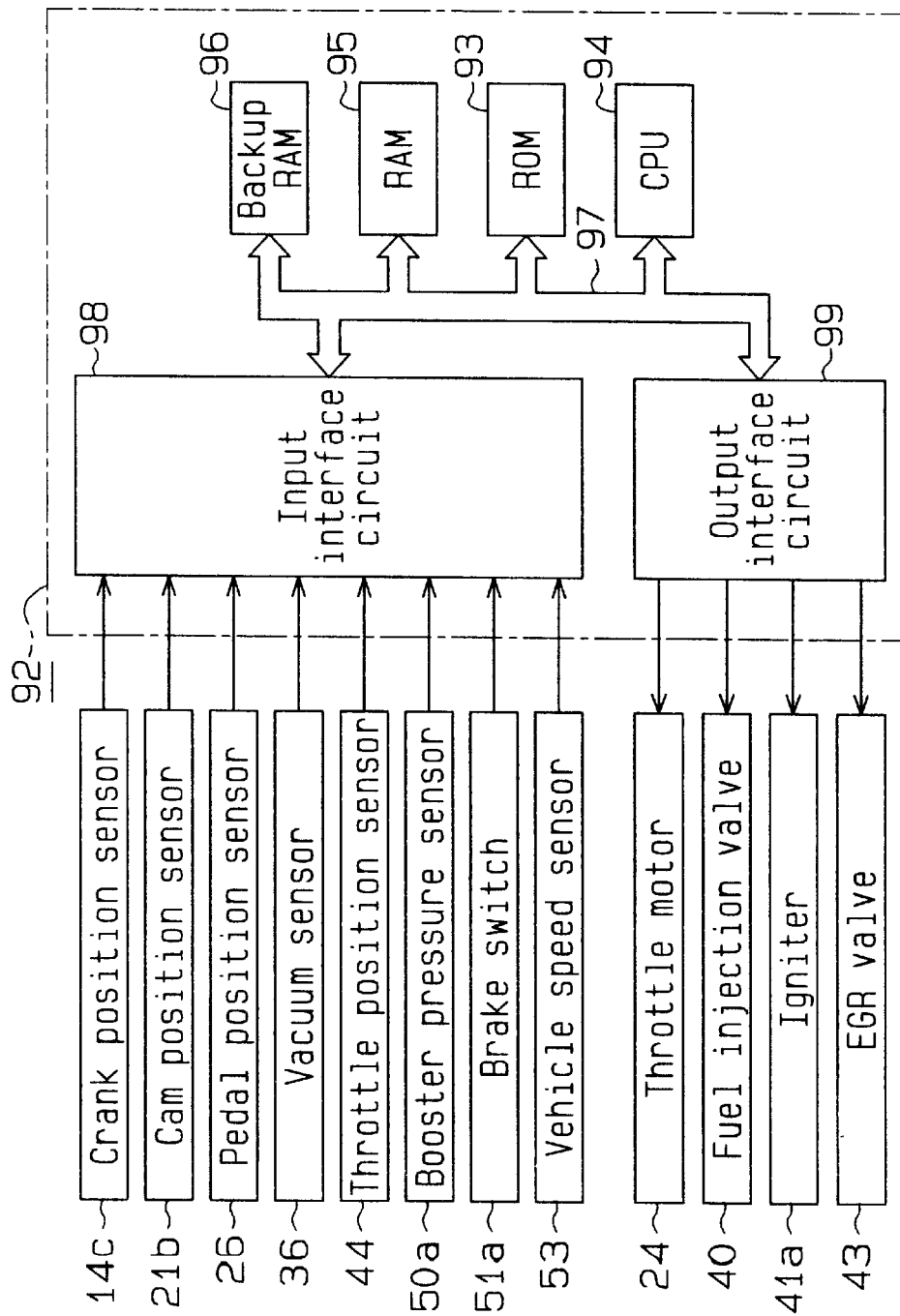
FIG. 2 is a block diagram showing electric control parts of the engine of FIG. 1.

The electric parts of the negative pressure control apparatus for the engine 11 according to this embodiment will be discussed below referring to FIG. 2.

The negative pressure control apparatus has an electronic control unit (hereinafter called "ECU") 92 which controls the variables of the engine 11, such as the fuel injection amount, the fuel injection timing, the ignition timing, and the throttle and EGR positions. The ECU 92 is constructed as an arithmetic and logic circuit that has a ROM 93, CPU 94, RAM 95 and backup RAM 96.

Stored in the ROM 93 are various control programs and maps or the like, which are referred to when the control programs are run. The CPU 94 executes operations based on the various control programs and maps stored in the ROM 93. The RAM 95 temporarily stores the results of an operation performed by the CPU 94, data input from various sensors, and so forth. The backup RAM 96 is a non-volatile memory which saves information when the engine 11 is stopped. The ROM 93, CPU 94, RAM 95 and backup RAM 96 are connected to one another and to an input interface circuit 98 and an output interface circuit 99 by a bus 97.

Connected to the input interface circuit 98 are the crank position sensor 14c, the cam position sensor 21b, the accelerator position sensor 26, the vacuum sensor 36, the throttle position sensor 44, the booster pressure sensor 50a, the brake switch 51a and the vehicle speed sensor 53. Connected to the output interface circuit 99 are the throttle motor 24, the fuel injection valve 40, the igniter 41a and the EGR valve 43.

The ECU 92 switches the combustion system between stratified charge combustion and homogeneous charge combustion in accordance with the running conditions of the engine 11. Specifically, the ECU 92 acquires the engine speed NE based on the detection signal from the crank position sensor 14c. The ECU 92 also acquires the intake pressure PM based on the detection signal from the vacuum sensor 36 and the accelerator depression amount ACCP based on the detection signal from the accelerator position sensor 26. Based on the intake pressure PM or accelerator depression amount ACCP and the engine speed NE, the ECU 92 computes a basic fuel injection amount Qbse corresponding to the engine load.

The ECU 92 switches the combustion system of the engine 11 based on the basic fuel injection amount Qbse and the engine speed NE. For example, the ECU 92 carries out homogeneous charge combustion when the engine 11 operates under high-speed or heavy-load conditions and carries out stratified charge combustion when the engine 11 operates under low-speed or light-load conditions. The reason for changing the combustion mode is to improve the fuel consumption by enriching the air-fuel ratio in the high-speed or heavy-load conditions, which demand high power, and making the air-fuel ratio more lean under low-speed or light-load conditions, which require less power.

With the combustion system of the engine 11 set to the homogeneous charge combustion mode, the ECU 92 computes the basic fuel injection amount Qbse based on the intake pressure PM and engine speed NE. Then, the ECU 92 controls the actuation of the fuel injection valve 40 to inject fuel, the quantity of which corresponds to a final fuel injection amount Qfin acquired from the basic fuel injection amount Qbse, into the combustion chamber 16 during the suction stroke of the engine 11. This fuel injection sets the air-fuel ratio of the air-fuel mixture formed in the combustion chamber 16 to the stoichiometric air-fuel ratio or an air-fuel that is richer than the stoichiometric air-fuel ratio. The air-fuel ratio of the air-fuel mixture is controlled by the ECU 92 to be stoichiometric by feedback correction of the fuel injection amount based on the detection signal from an oxygen sensor 34.

Further, the ECU 92 computes a target throttle position, or angle TAt, based on the accelerator depression amount ACCP and the engine speed NE, and controls the throttle motor 24 such that the actual throttle position, which is computed based on the detection signal from the throttle position sensor 44, approaches the target throttle angle TAt. The ECU 92 also computes a target ignition timing and a target EGR angle based on the intake pressure PM and the engine speed NE, and controls the actuation of the igniter 41a and the EGR valve 43 based on the target ignition timing and the target EGR angle. Such control of the throttle angle, the ignition timing and the target EGR angle (EGR amount) makes the throttle position, the ignition timing and EGR amount suitable for homogeneous charge combustion.

When the engine 11 operates in the stratified charge combustion mode, the ECU 92 computes the basic fuel injection amount Qbse based on the accelerator depression amount ACCP and the engine speed NE. Then, the ECU 92 controls the actuation of the fuel injection valve 40 to inject fuel, the quantity of which corresponds to the final fuel injection amount Qfin acquired from the basic fuel injection amount Qbse, into the combustion chamber 16 during the compression stroke of the engine 11. The air-fuel ratio of the air-fuel mixture formed in the combustion chamber 16 by this injection is more lean than the air-fuel ratio in the homogeneous charge combustion mode.

Further, the ECU 92 computes the target throttle angle TAt based on the running conditions of the engine 11, such as the basic fuel injection amount Qbse and the engine speed NE, as will be discussed later, and controls the throttle motor 24 such that the actual throttle angle approaches the target throttle angle TAt. The ECU 92 also computes the target ignition timing and the target valve EGR angle based on the running conditions of the engine 11, such as the basic fuel injection amount Qbse and the engine speed NE. The ECU 92 controls the actuation of the igniter 41a and the EGR valve 43 based on the target ignition timing and the target EGR angle. Such control of the throttle position, the ignition timing and the target EGR valve angle (EGR amount) makes the throttle angle, ignition timing and EGR amount suitable for stratified charge combustion.

In the stratified charge combustion mode, the fuel injected from the fuel injection valve 40 during the compression stroke of the engine 11 enters the indentation 12a (FIG. 1) in the head of each piston 12 and is collected around the ignition plug 41 as the piston 12 moves. The air-fuel ratio of the mixture collected around the ignition plug 41 is suitable for ignition so that the air-fuel mixture is ignited properly, even though the average air-fuel ratio of the entire mixture in the combustion chamber 16 is leaner than that of homogeneous charge combustion. As the average air-fuel ratio of the entire air-fuel mixture in the combustion chamber 16 is increased above that of homogeneous charge combustion (made leaner) in the stratified charge combustion mode, the engine pumping loss is reduced.

Figure 3:
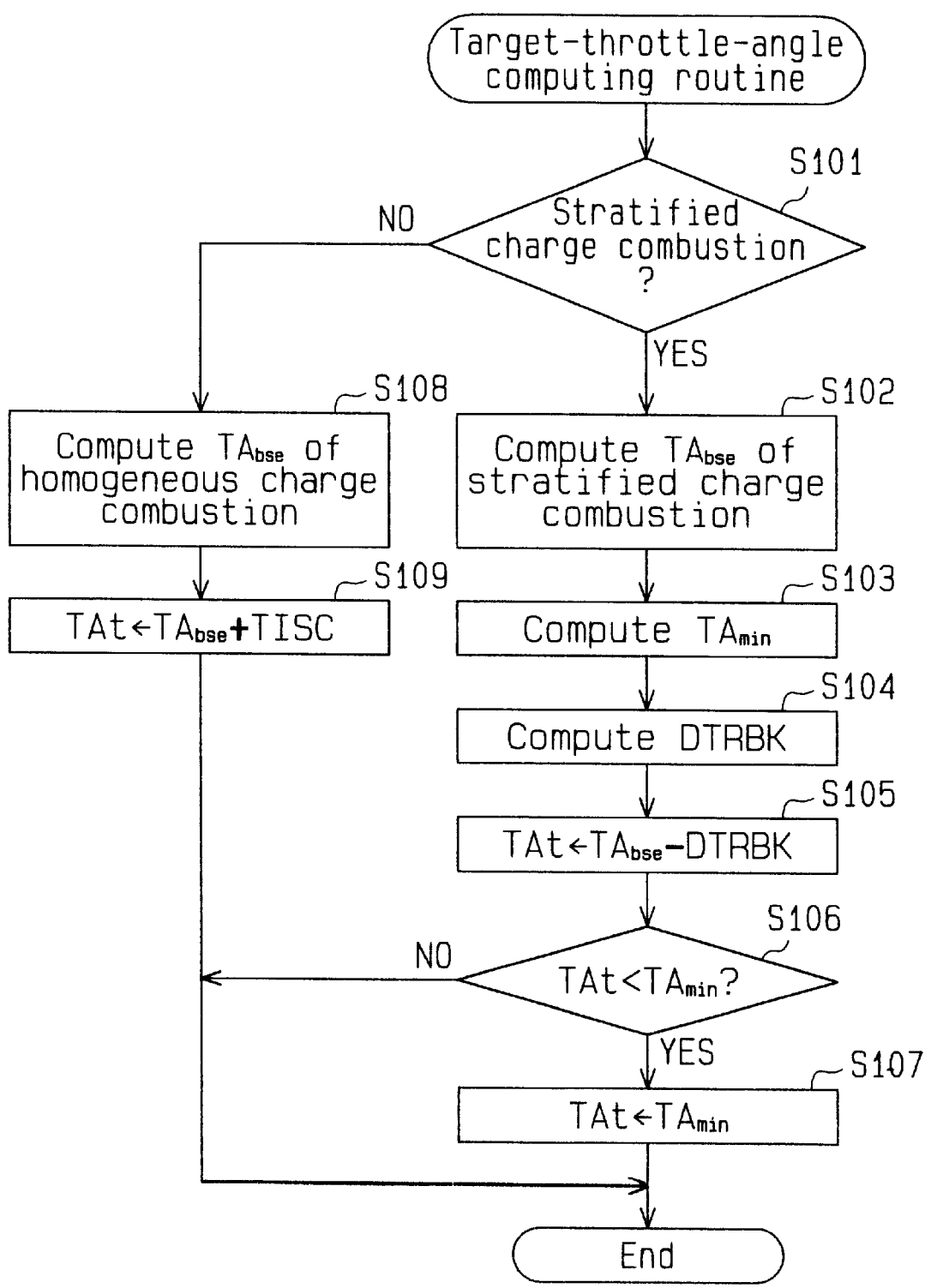
FIG. 3 is a flowchart illustrating a routine for computing a target throttle angle.

A procedure for controlling the throttle angle will now be explained with reference to FIG. 3. FIG. 3 is a flowchart illustrating a routine for computing the target throttle angle Tat. The target-throttle-angle computing routine is executed by the ECU 92 at predetermined time intervals.

In the target-throttle-angle computing routine, the ECU 92 checks in step S101 if stratified charge combustion is currently in progress. If the stratified charge combustion is not currently being performed, the flow proceeds to step S108. In step S108, the ECU 92 computes a basic throttle angle TAbse for the homogeneous charge combustion mode by referring to a known map. In this manner, the basic throttle angle TAbse increases as the accelerator depression amount ACCP increases. After the computation of the basic throttle angle TAbse for the homogeneous charge combustion mode, the flow proceeds to step S109.

In step S109, the ECU 92 adds a throttle angle TISC in idling mode to the basic throttle angle TAbse and sets the resultant value as the target throttle angle TAt for the homogeneous charge combustion mode. Then, this routine is temporarily terminated. When the target throttle angle TAt in the homogeneous charge combustion mode has been computed, the ECU 92 controls the throttle motor 24 such that the actual throttle angle approaches the target throttle angle TAt. This procedure sets the throttle angle for homogeneous charge combustion.

If it is determined in step S101 that stratified charge combustion is currently in progress, the flow goes to step S102. In the sequence of steps S102 to S107, the target throttle angle TAt for the stratified charge combustion mode is computed (step S105). That is, in step S105, the ECU 92 computes the target throttle angle TAt for the stratified charge combustion mode based on the basic throttle angle TAbse and a closing amount DTRBK, which will be discussed later.

The basic throttle angle TAbse and closing amount DTRBK, which are used in computing the target throttle angle TAt, are respectively calculated in steps S102 and S104. The target throttle angle computed in step S105 has a minimum value TAmin, which is computed in step S103. In this description, "closing" the throttle valve 23 does not refer to full closure of the intake passage. Rather, "closing" refers to moving the throttle valve 23 in the closing direction to a certain degree.

In the stratified charge combustion mode, the throttle angle control is performed based on the target throttle angle Tat, which is equal to or greater than TAmin. That is, the ECU 92 controls the throttle motor 24 such that the actual throttle angle approaches the target throttle angle TAt. This procedure sets the throttle angle for stratified charge combustion.

In the target-throttle-angle computing routine, the ECU 92 computes, in step S102, the basic throttle angle TAbse for the stratified charge combustion mode by referring to a map (discussed later), based on the running conditions of the engine 11, such as the basic fuel injection amount Qbse and the engine speed NE. Accordingly, the basic throttle angle TAbse increases as the basic fuel injection amount Qbse increases. In the subsequent step S103, the ECU 92 computes the minimum throttle angle TAmin based on the basic fuel injection amount Qbse and the engine speed NE. The minimum throttle angle TAmin increases as the basic fuel injection amount Qbse and the engine speed NE increase, and the minimum throttle angle TAmin is used in steps S106 and S107, which and will be discussed later.

The ECU 92 computes the closing amount DTRBK in step S104 and calculates the target throttle angle TAt in the stratified charge combustion mode by subtracting the closing amount DTRBK from the basic throttle angle TAbse in step S105. Further, the ECU 92 determines in step S106 whether the target throttle angle TAt is smaller than the minimum throttle angle TAmin. Unless TAt<TAmin, the ECU 92 temporarily terminates the target-throttle-angle computing routine. If TAt<TAmin, the ECU 92 sets the throttle angle Tat to the minimum throttle angle TAmin in step S107 and then temporarily terminates the target-throttle-angle computing routine.

The target throttle angle TAt, computed in the above-described manner, decreases as the closing amount DTRBK increases. The closing amount DTRBK serves to cause the brake pressure PBK, which is obtained by subtracting the booster working pressure PV from the atmospheric pressure, to reach a value necessary to activate the brake booster 50. The closing amount DTRBK is calculated based on the brake pressure PBK. The atmospheric pressure is acquired based on the detection signal from the vacuum sensor 36 when the engine 11 is started, and the booster working pressure PV is acquired based on the detection signal from the booster pressure sensor 50a.

The closing amount DTRBK is computed immediately after the brake pressure PBK becomes insufficient such that the target throttle angle TAt is close to the minimum throttle angle TAmin and is computed thereafter such that the target throttle angle TAt gradually decreases further. Accordingly, the throttle valve 23 is quickly closed immediately after the brake pressure PBK becomes insufficient and is then gradually closed further.

When the choking, or closing control, of the throttle valve 23 is performed, the intake pressure PM and the booster working pressure PV decrease so that the brake pressure PBK reaches the value needed to activate the brake booster 50. When the brake pressure PBK reaches the value needed to activate the brake booster 50, the closing amount DTRBK is computed to gradually decrease. As a result, the target throttle angle TAt gradually increases, slowly returning the throttle to the angle it had before the initiation of the closing control.

Control of the throttle for producing the required brake pressure PBK will now be discussed referring to FIGS. 5(a), 5(b) and 5(c). These Figures are time charts illustrating the variation of the intake pressure PM, the target throttle angle TAt and the brake pressure PBK when throttle closing control is performed. Note that the scale for the brake pressure PBK is opposite to that of the intake pressure PM in FIGS. 5(a) to 5(c). Also, note that the brake pressure PBK is always a positive, scalar value.

In the stratified charge combustion mode, when the brake booster 50 is activated by the depression of the brake pedal 51, the brake pressure PBK decreases and becomes less than the pressure needed to activate the brake booster 50 (hereinafter called "demanded value X") as indicated by a solid line L1 in FIG. 5(a). When the brake pressure PBK becomes insufficient, as in this case, the target throttle angle TAt is swiftly set to a value near the minimum throttle angle TAmin initially and is thereafter gradually decreased further, as shown in FIG. 5(b).

Such control of the throttle valve 23 causes the intake pressure PM of the engine 11 to gradually fall as indicated by a solid line L2 in FIG. 5(a). As the intake pressure PM falls, the booster working pressure PV falls and the brake pressure PBK, which is acquired by subtracting the booster working pressure PV from the atmospheric pressure, increases.

When the brake pressure PBK reaches a value that is greater than the demanded value X by a predetermined value α and the brake pressure PBK needed to activate the brake booster 50 exists, the target throttle angle TAt is gradually increased (throttle is opened) as shown in FIG. 5(b). This causes the throttle valve 23 to return to the angle it had before the initiation of the throttle closing control. The execution of the throttle closing control can produce the brake pressure PBK needed to activate the brake booster 50 if the brake pressure PBK becomes insufficient.

It is preferred that the time from the point when the brake pressure PBK becomes insufficient to the point when the required brake pressure PBK exits should be as short as possible to improve the braking performance of the vehicle. One way to shorten this time is to set the angle of the throttle valve 23 in the normal stratified charge combustion mode to a value that is partially closed to a certain degree so that the intake pressure PM is maintained in a vacuum state in advance. In this case, the basic throttle angle TAbse in the stratified charge combustion mode is preset such that the angle TAbse causes a certain degree of valve closure at the time it is computed in accordance with the running conditions of the engine 11, so that the target throttle angle TAt derived from the basic throttle angle TAbse causes partial closure of the throttle valve 23.

By setting the target throttle angle TAt to cause some degree of closure and thus keeping the intake pressure PM relatively low as indicated by the solid line L2 in FIG. 5(a), it is possible to rapidly increase the brake pressure PBK and thus improve the braking performance. As indicated by a solid line L5 in FIG. 5(c), however, even when the value of the brake pressure PBK is relatively far greater than the demanded value X, the throttle valve 23 is partially closed to a certain degree to keep the intake pressure PM relatively as indicated by a broken line L6. This increases the pumping loss in the stratified charge combustion mode, thus reducing the fuel efficiency of the engine 11.

Figure 4:
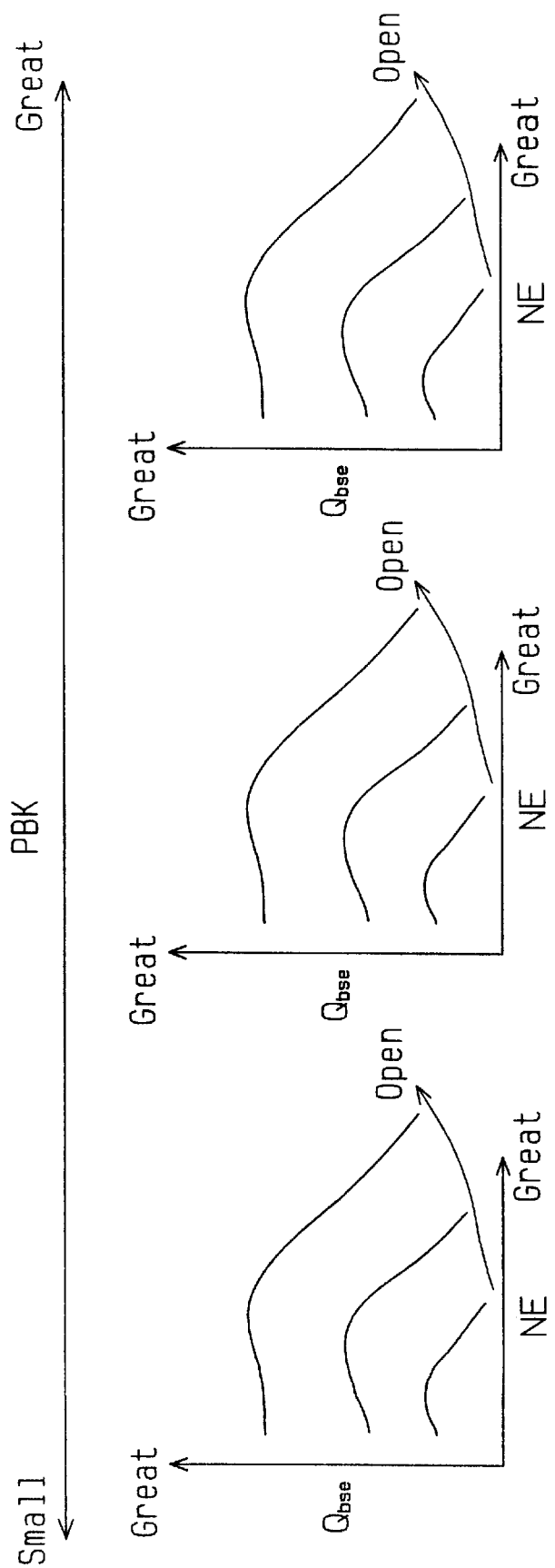
FIG. 4 is a map, which is referred to when computing a basic throttle angle.
Figure 5:
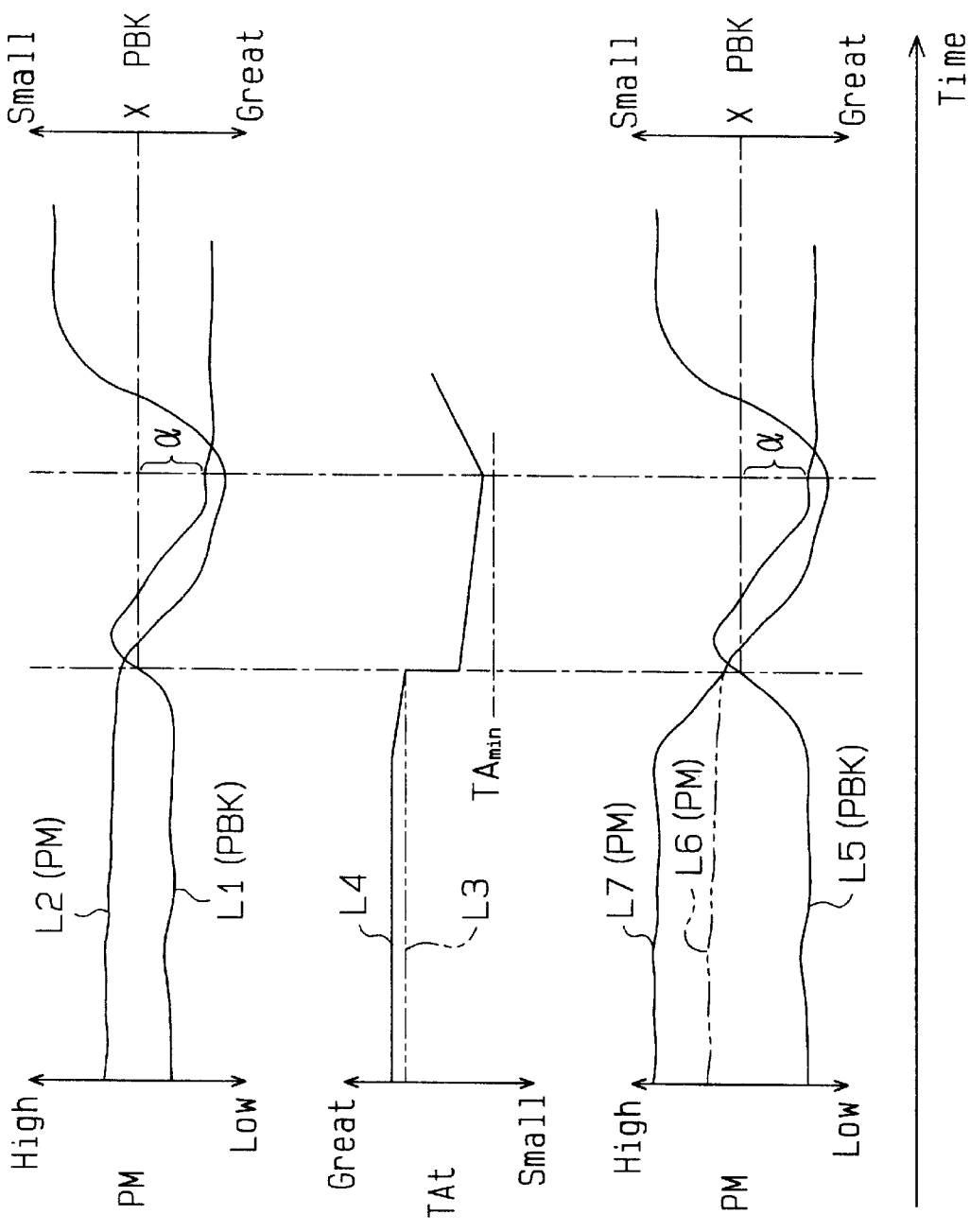
FIGS. 5(a) to 5(c) are time charts illustrating variation of intake pressure PM, a target throttle angle TAt and brake pressure PBK when choking is performed.

According to this embodiment, therefore, the basic throttle angle TAbse in the stratified charge combustion mode is computed based on the brake pressure PBK, which is obtained from the booster working pressure PV. That is, the basic throttle angle TAbse in the stratified charge combustion mode is computed based on the brake pressure PBK as well as the basic fuel injection amount Qbse and the engine speed NE in step S102 in the target-throttle-angle computing routine (FIG. 3). When computing the basic throttle angle TAbse, the map shown in FIG. 4 is referred to. The solid lines in FIG. 4 show combinations of the basic fuel injection amount Qbse and the engine speed NE that make the basic throttle angle TAbse constant when the brake pressure PBK is constant. In FIG. 4, the higher the solid line is located, the higher the corresponding value of the constant basic throttle angle TAbse is, that is, the more widely open the throttle is.

Given that the brake pressure PBK is constant, as apparent from FIG. 4, the value of the basic throttle angle TAbse increases as the basic fuel injection amount Qbse and the engine speed NE increases, i.e., when the engine approaches a high-speed and heavy-load state. Further, the greater the magnitude of the brake pressure PBK becomes, the greater the value of the basic throttle angle TAbse becomes. Therefore, the target throttle angle TAt, which is derived from the basic throttle angle TAbse, changes based on the brake pressure PBK in step S105 in the target-throttle-angle computing routine (FIG. 3). Since the throttle motor 24 is controlled based on the target throttle angle TAt, the throttle valve 23 is controlled based on the brake pressure PBK (booster working pressure PV).

That is, when the booster working pressure PV has reached the value needed to activate the brake booster 50, and the brake pressure PBK is significantly greater than the demanded value X, the level of the brake pressure PBK is not likely to subsequently fall below the demanded value X. As the value of the brake pressure PBK increases with respect to the demanded value X, it is possible to open the throttle valve 23. With such throttle angle control, when the booster working pressure PV required to activate the brake booster 50 is relatively low, the throttle valve 23 is opened, causing the intake pressure PM to increase. As a result, the pumping loss of the engine 11 is reduced, thereby improving the fuel efficiency.

When the booster working pressure PV is low enough to activate the brake booster 50 but the value of the brake pressure PBK is close to the demanded value X, the brake pressure PBK is likely to fall below the demanded value X. When the value of the brake pressure PBK is close to but greater than the demanded value X, the throttle valve 23 is partially closed. When the brake pressure PBK becomes less than the demanded value X in this situation, the throttle closing control swiftly increases the brake pressure PBK to a value above the demanded value X.

In this throttle angle control procedure, if the value of the brake pressure PBK is significantly above the demanded value X, as indicated by the solid line L5 in FIG. 5(c), the target throttle angle TAt is increased to a higher degree than that represented by the broken line L3, which represents the target throttle angle TAt when the brake pressure PBK is close to the demanded value X, to a value indicated by the solid line L4 in FIG. 5(b). Therefore, the throttle valve 23, the angle of which is controlled based on the target throttle angle TAt, is opened more widely than it is when the brake pressure PBK is close to the demanded value X. This opening of the throttle valve 23 causes the intake pressure PM to increase with respect to that represented by the broken line L6 in FIG. 5(c), as indicated by a solid line L7. Consequently, the pumping loss of the engine 11 is reduced, which improves the fuel efficiency.

When, in this situation, the brake pressure PBK decreases and approaches the demanded value X, as indicated by the solid line L5, due to some cause, the target throttle angle TAt (basic throttle angle TAbse), which is computed based on the brake pressure PBK, is gradually reduced as indicated by the solid line L4, in accordance with the decrease in the brake pressure PBK toward the demanded value X. When the brake pressure PBK reaches the demanded value X, the target throttle angle TAt, which is indicated by the solid line L4, crosses the broken line L3, and the intake pressure PM, which is indicated by the solid line L7, crosses the broken line L6. When the brake pressure PBK further decreases below the demanded value X, the throttle closing control procedure is performed so that the brake pressure PBK swiftly increases above the demanded value X.

This embodiment, as specifically described above, has the following advantages.

The target throttle angle TAt used in the throttle angle control procedure (basic throttle angle TAbse) is computed based on the brake pressure PBK, the basic fuel injection amount Qbse, and the engine speed NE. When the brake pressure PBK is relatively small, i.e., when the required booster working pressure PV needed to activate the brake booster 50 is relatively high, the throttle valve 23 is closed. When the booster working pressure PV is relatively low, the throttle valve 23 is opened. Such control of the throttle angle decreases the intake pressure PM when the booster working pressure PV is relatively high and the brake pressure PBK is close to the demanded value X, and quickly increases the brake pressure PBK to a value greater than the demanded value X, thereby providing the needed braking performance when, for some reason, the brake pressure PBK becomes too small. When the booster working pressure PV is relatively low and the brake pressure PBK is not likely to fall below the demanded value X, the intake pressure PM can be set to a relatively high level so that the pumping loss of the engine 11 is reduced, which improves the fuel efficiency.

Since the basic throttle angle TAbse is computed based on the brake pressure PBK by referring to the map in FIG. 4, the throttle valve 23 is opened in accordance with the level of the booster working pressure PV needed to activate the brake booster 50 (the required brake pressure PBK for the demanded value X) such that, as the difference between the brake pressure PBK and the demanded value X increases, the intake pressure PM increases. It is therefore possible to accurately execute the throttle angle control in accordance with the level of the booster working pressure PV, thereby precisely regulating the intake pressure PM to the needed level. This maintains braking performance while improving the fuel efficiency.

Since the brake booster 50 is activated based on the differential pressure between the atmospheric pressure and the booster working pressure PV, the booster working pressure PV that is needed to activate the brake booster 50 changes in accordance with the atmospheric pressure. Because the throttle angle is controlled based on the brake pressure PBK, or the pressure difference between the atmospheric pressure and the booster working pressure PV, however, this throttle angle control procedure precisely adjusts the intake pressure PM to an optimal value that reflects the atmospheric pressure.

Second Embodiment

The second embodiment of this invention will now be described referring to FIGS. 6 through 8(c).

According to this embodiment, when the brake pressure PBK decreases or the brake pedal 51 is manipulated in the stratified charge combustion mode, the throttle valve 23 is closed by a predetermined amount so that the intake pressure PM drops, regardless of the difference between the brake pressure PBK and the demanded value X. When the brake pressure PBK falls below the demanded value X, this throttle angle control procedure swiftly raises the brake pressure PBK above the demanded value X, thus raising the brake pressure PBK to the level required to activate the brake booster 50 without a response delay.

This embodiment differs from the first embodiment only the computation the basic throttle angle TAbse in the target-throttle-angle computing routine. Therefore, the following description of this embodiment will discuss only the differences from the first embodiment and the details of those portions that are the same are omitted.

Figure 6:
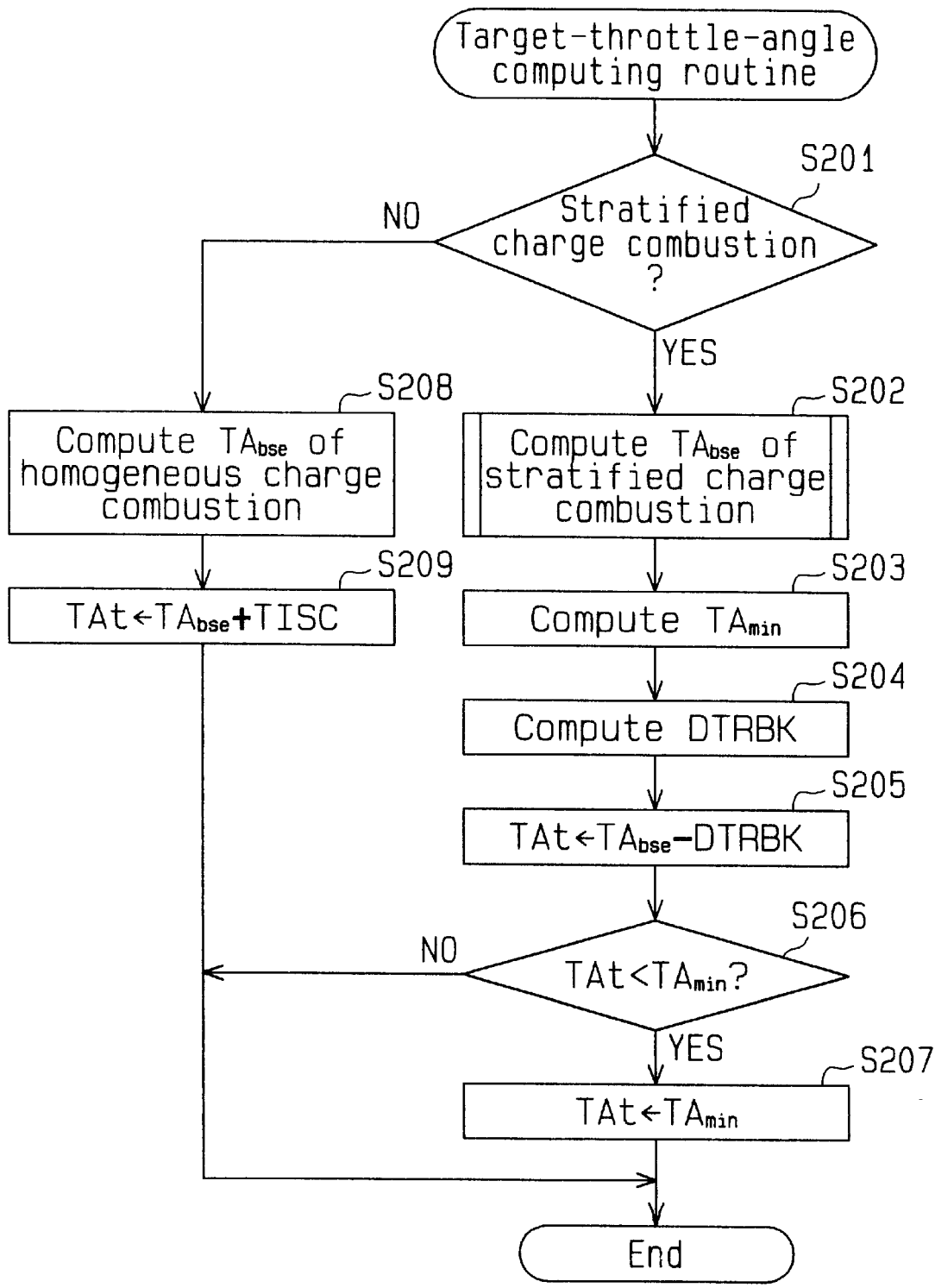
FIG. 6 is a flowchart illustrating a routine for computing a target throttle angle according to a second embodiment.

FIG. 6 is a flowchart illustrating a target-throttle-angle computing routine according to this embodiment. The target-throttle-angle computing routine according to this embodiment differs from that of the first embodiment only in a process (step S202 of FIG. 6) corresponding to step S102 of FIG. 3.

In step S201, the ECU 92 determines if stratified charge combustion is currently in progress. If stratified charge combustion is not currently being carried out, the ECU 92 computes the basic throttle angle TAbse in the homogeneous charge combustion mode and the target throttle angle TAt in steps S208 and S209 and then temporarily terminates this routine.

When it is determined in step S201 that stratified charge combustion is currently in progress, the ECU 92 computes the basic throttle angle TAbse for the stratified charge combustion mode. Then, the minimum throttle angle TAmin and the closing amount DTRBK are calculated in the subsequent steps S203 and S204. The target throttle angle TAt is calculated based on the basic throttle angle TAbse, the minimum throttle angle TAmin and the closing amount DTRBK in steps S205 to S207. After the target throttle angle TAt in the stratified charge combustion mode is computed in this manner, the ECU 92 temporarily terminates this routine.

Figure 7:
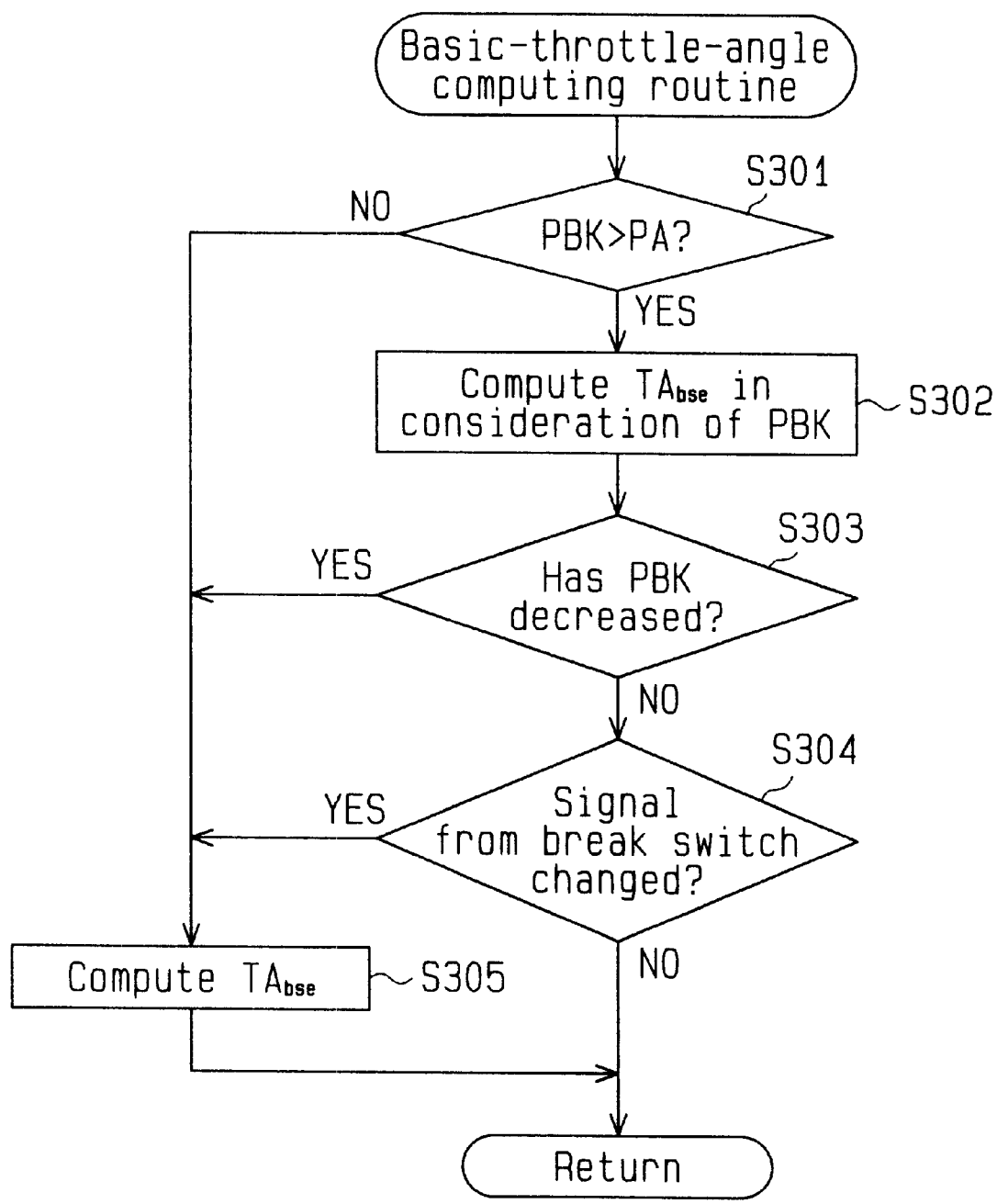
FIG. 7 is a flowchart illustrating a routine for computing a basic throttle angle.

Referring now to FIG. 7, the process in step S202 in the target-throttle-angle computing routine will be discussed specifically. FIG. 7 is a flowchart illustrating a basic-throttle-angle computing routine for computing the basic throttle angle TAbse in the stratified charge combustion mode. The basic throttle angle TAbse is executed by the ECU 92 every time step S202 is performed in the target-throttle-angle computing routine.

In the basic-throttle-angle computing routine, step S301 determines whether the level of the booster working pressure PV is low enough to activate the brake booster 50, i.e., whether the difference between the brake pressure PBK and the demanded value X is great. When the difference between the brake pressure PBK and the demanded value X is small, the throttle valve 23 is moved to an angle that causes the required brake pressure PBK to be swiftly produced by the throttle closing control. When the difference between the brake pressure PBK and the demanded value X is great, the throttle angle control, which is based on the brake pressure PBK, is such that as the brake pressure PBK increases, the throttle valve 23 is opened more widely. Accordingly, the pumping loss is reduced and the required brake pressure PBK can be quickly reached.

In step S301, the ECU 92 determines whether the brake pressure PBK is greater than a determination value PA. When the brake pressure PBK is not greater than the determination value PA and the brake pressure PBK is close to the demanded value X, the ECU 92 computes the basic throttle angle TAbse based on the engine speed NE and the basic fuel injection amount Qbse by referring to a map (not shown) in step S305. The basic throttle angle TAbse is used to quickly provide the necessary level of the brake pressure PBK.

That is, the basic throttle angle TAbse is computed so that, when the throttle angle control is executed based on the target throttle angle TAt computed from this basic throttle angle TAbse, the brake pressure PBK can be rapidly increased. After the computation of the basic throttle angle TAbse, the ECU 92 temporarily terminates the basic-throttle-angle computing routine of FIG. 7 and returns to the target-throttle-angle computing routine (FIG. 6).

When it is determined in step S301 that the brake pressure PBK is greater than the determination value PA, i.e., when the difference between the brake pressure PBK and the demanded value X is great, the ECU 92 computes the basic throttle angle TAbse based on the engine speed NE, the basic fuel injection amount Qbse and the brake pressure PBK by referring to the map shown in FIG. 4 in step S302. Since the throttle angle control is carried out based on the target throttle angle TAt computed from the basic throttle angle TAbse, the necessary level of the brake pressure PBK is produced while the pumping loss is reduced.

Figure 8A:
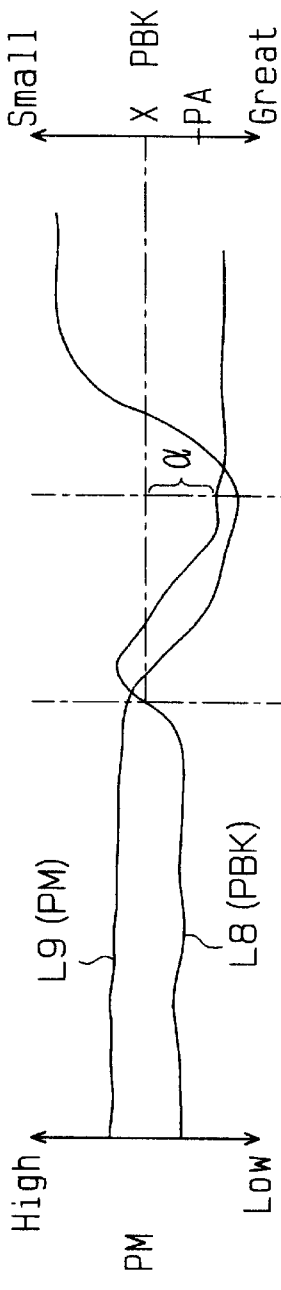
FIGS. 8(a) to 8(c) are time charts illustrating the transition of intake pressure PM, a target throttle angle TAt and brake pressure PBK when choking is performed.
Figure 8B:
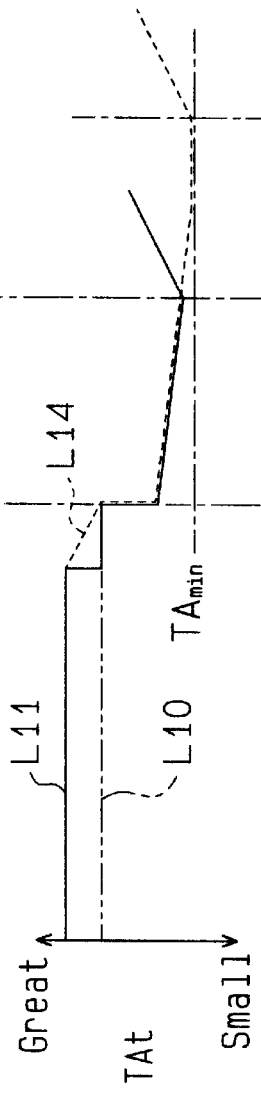
Figure 8C:
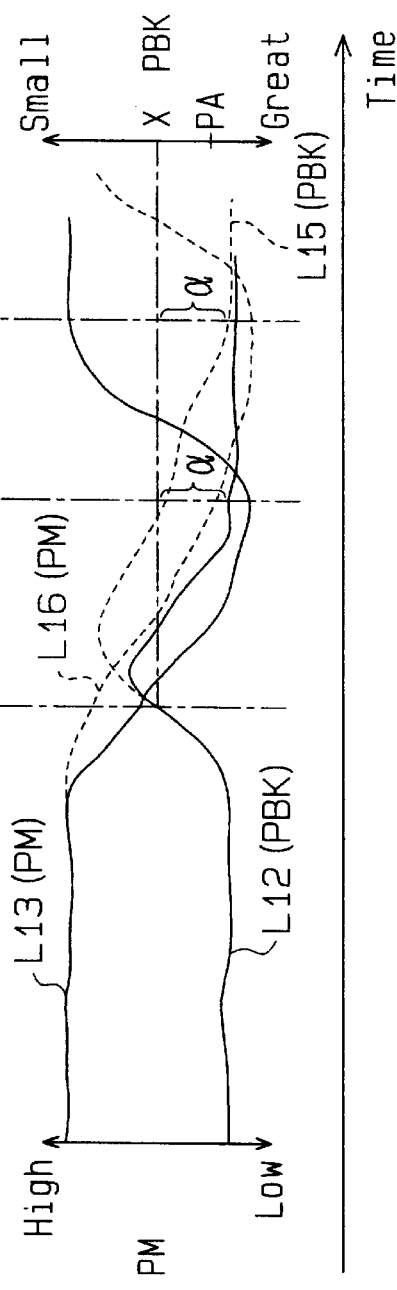

The throttle angle control based on the brake pressure PBK will now be discussed referring to FIGS. 8(a), 8(b) and 8(c). FIGS. 8(a) to 8(c) are time charts illustrating the variation of the intake pressure PM, the target throttle angle TAt and the brake pressure PBK when the throttle closing control for producing the necessary brake pressure PBK is performed.

As indicated by a solid line L8 in FIG. 8(a), when the brake pressure PBK is smaller than the determination value PA, i.e., when the difference between the brake pressure PBK and the demanded value X is small, the basic throttle angle TAbse is computed in step S305 such that the target throttle angle TAt represents a relatively closed throttle valve position as indicated by the broken line L10 in FIG. 8(b). Controlling the throttle angle based on the target throttle angle TAt thus causes the intake pressure PM to be at a level such that the required brake pressure PBK is rapidly produced when the throttle closing control is initiated.

As indicated by a solid line L12 in FIG. 8(c), when the brake pressure PBK is greater than the determination value PA, i.e., when the difference between the brake pressure PBK and the demanded value X is great, the basic throttle angle TAbse is computed in step S302 such that the target throttle angle TAt represents a relatively open valve position as indicated by a solid line L11 in FIG. 8(b). Controlling the throttle angle based on the target throttle angle TAt thus reduces the pumping loss, so that, as indicated by a solid line L13 in FIG. 8(c), the intake pressure PM is higher than that indicated by the solid line L9 of FIG. 8(a).

Even if the brake pressure PBK is greater than the determination value PA, when the depression of the brake pedal 51 starts or ends, the brake pressure PBK rapidly decreases and is smaller than the demanded value X as indicated by the solid line L12 in FIG. 8(c). Even if the target throttle angle Tat gradually decreases as indicated by a broken line L14 in FIG. 8(b) in response to a decrease in the brake pressure PBK relative to the demanded value X, the change in the intake pressure PM is delayed in response to the change in the throttle angle. Accordingly, the intake pressure PM falls gently as indicated by a broken line L16 in FIG. 8(c). The brake pressure PBK therefore changes as indicated by a broken line L15 in FIG. 8(c) and increases by a predetermined value a relative to the demanded value X. Thus, it takes time to produce the necessary level of the brake pressure PBK.

According to this embodiment, however, when the brake pressure PBK decreases or the manipulation of the brake pedal 51 is detected based on the signal from the brake switch 51a, the basic throttle angle TAbse is set such that the necessary value of the brake pressure PBK is quickly produced under the throttle closing control, regardless of the difference between the brake pressure PBK and the demanded value X. As a result, when the brake pressure PBK decreases significantly, the target throttle angle TAt is closed immediately by a predetermined amount as indicated by the solid line L11 in FIG. 8(b).

Even if the change in the intake pressure PM is delayed after the change of the throttle angle when controlling the throttle angle based on the target throttle angle TAt, which changes as indicated by the solid line L11, the intake pressure PM quickly falls as indicated by the solid line L13 in FIG. 8(c). The rapid drop in the intake pressure PM causes the brake pressure PBK to vary as indicated by the solid line L12 in FIG. 8(c). This shortens the time needed for the brake pressure PBK to reach a value that is greater by the predetermined value α from the demanded value X. It is thus possible to quickly produce the required brake pressure PBK and maintain the braking performance.

In the basic-throttle-angle computing routine (FIG. 7), steps S303 and S304 are provided to set the basic throttle angle TAbse to a level such that the required brake pressure PBK is quickly produced during the throttle closing control, regardless of the level of the brake pressure PBK with respect to the demanded value X.

That is, the ECU 92 determines, in step S303, whether the brake pressure PBK has decreased and, in step S304, whether the brake pedal 51 has been manipulated based on the signal from the brake switch 51a.

When the brake pressure PBK does not decrease and there is no change in the signal from the brake switch 51a, which means that the brake pedal 51 has not been manipulated, the decision outcome in both the steps S303 and S304 is negative, and the ECU 92 temporarily terminates the basic-throttle-angle computing routine of FIG. 7 and returns to the target-throttle-angle computing routine of FIG. 6.

When there is a decrease in the brake pressure PBK or there is a change in the signal from the brake switch 51a, which means that the brake pedal 51 has been manipulated, the decision outcome in either step S303 or S304 is positive, and step S305 is executed. Step S305 sets the basic throttle angle TAbse such that the required magnitude of the brake pressure PBK is quickly produced during the throttle closing control procedure.

Even if the brake pressure PBK is relatively great with respect to the demanded value X and the basic throttle angle TAbse is computed according to the brake pressure PBK in step S302, therefore, when the brake pressure PBK decreases or the brake pedal 51 is manipulated, the basic throttle angle TAbse is set such that the required brake pressure PBK is quickly produced during the throttle closing control procedure, regardless of the level of the brake pressure PBK.

As a result, when the manipulation of the brake pedal 51 causes the brake pressure PBK to rapidly decrease from the determination value PA to a value lower than the demanded value X, the target throttle angle TAt decreases as indicated by the solid line L11 in FIG. 8(b) and the intake pressure PM quickly falls as indicated by the solid line L13 in FIG. 8(c). This rapid drop in the intake pressure PM shortens the time needed to produce the required value of brake pressure PBK and thus maintains braking performance.

This embodiment, which performs the processes specifically described above, has the following advantage.

When the level of the brake pressure PBK with respect to the demanded value X is relatively high and the brake pressure PBK decreases in accordance with the manipulation of the brake pedal 51, the basic throttle angle TAbse is set such that the required brake pressure PBK is rapidly produced during the throttle closing control, regardless of the level of the brake pressure PBK. As a result, the target throttle angle TAt changes to one causing the throttle valve 23 to be relatively closed, and controlling the throttle angle based on the target throttle angle TAt thus causes the intake pressure PM to quickly fall, even if the fall in the intake pressure PM is delayed after the change of the throttle angle. Even if the manipulation of the brake pedal 51 causes the brake pressure PBK to rapidly decrease below the demanded value X, therefore, it is possible to quickly produce the required level of the brake pressure PBK and maintain the braking performance.

Third Embodiment

The third embodiment of this invention will now be described referring to FIGS. 9 through 11(b).

This embodiment concerns a variation of the basic-throttle-angle computing routine (FIG. 7) of the second embodiment. In the basic-throttle-angle computing routine of the second embodiment, step S301 determines the necessary level of the brake pressure PBK considering the demanded value X based on the comparison between the determination value PA, which is greater than the demanded value X, and the brake pressure PBK. In the third embodiment, however, the determination value PA is varied in accordance with the vehicle speed.

When the brake pedal 51 is depressed to brake the vehicle and the brake booster 50 is activated, the brake pressure PBK decreases as the depression of the brake pedal 51 increases to increase the braking force. The greater the vehicle speed is, the greater the required braking force is. Therefore, the vehicle speed affects the brake pressure PBK. By setting the determination value PA in accordance with the vehicle speed, the control of the throttle angle (intake pressure) is more precise.

Thus, this embodiment differs from the second embodiment in that the required level of the brake pressure PBK for the demanded value X is determined in consideration of the vehicle speed. Therefore, the following description will discuss only the differences from the second embodiment and omits the details that are the same as the corresponding portions of the second embodiment.

Figure 9:
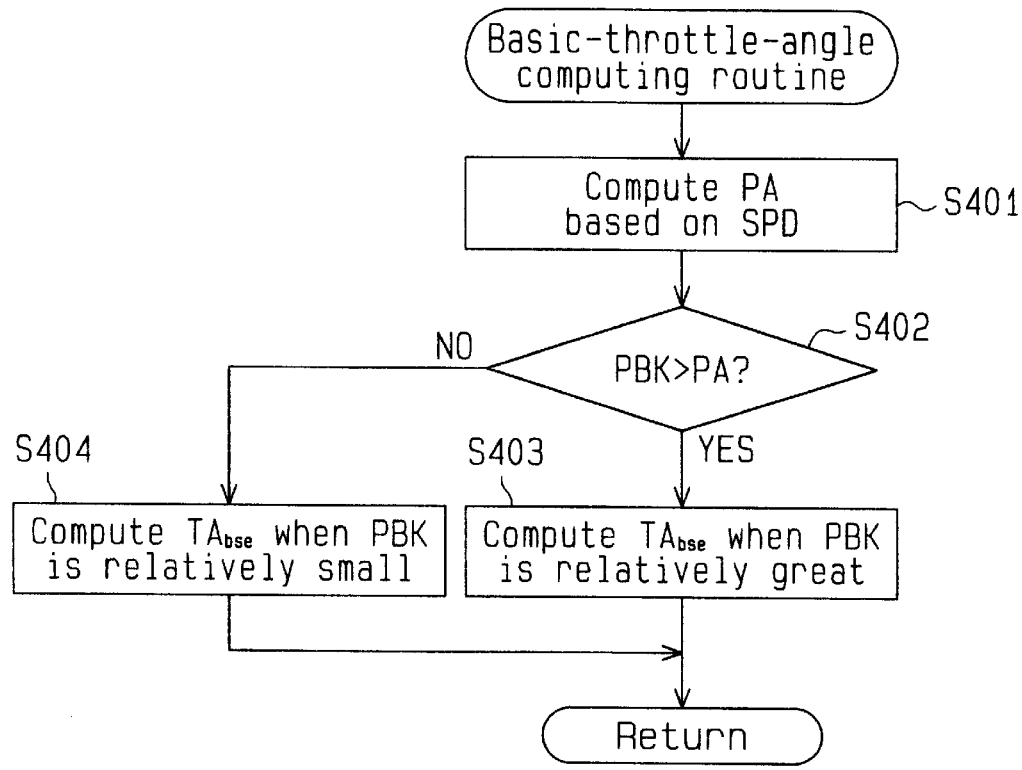
FIG. 9 is a flowchart illustrating a routine for computing a basic throttle angle according to a third embodiment.

FIG. 9 is a flowchart illustrating a basic-throttle-angle computing routine according to the third embodiment. In this basic-throttle-angle computing routine, it is determined in steps S401 and S402 whether or not the level of the booster working pressure PV is low enough to activate the brake booster 50. The basic throttle angle TAbse when the level of the brake pressure PBK is relatively great is computed in step S403, and the basic throttle angle TAbse when the level of the brake pressure PBK is relatively small is computed in step S404. The basic throttle angle TAbse that is computed in step S404 is more closed than the basic throttle angle TAbse computed in step S403.

Figure 10:
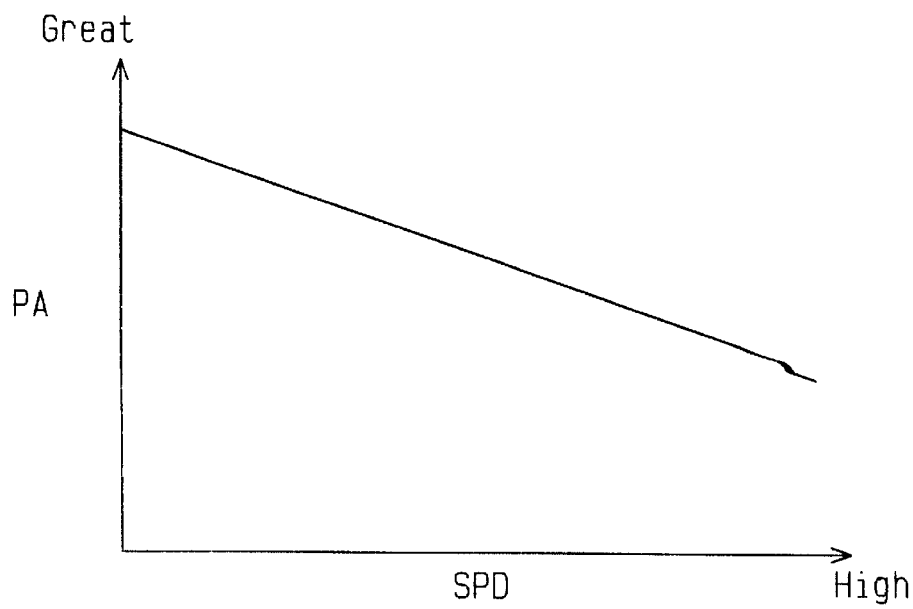
FIG. 10 is a graph showing the variation of a determination value PA with respect to a change in vehicle speed.

In the basic-throttle-angle computing routine, the ECU 92 computes the determination value PA in step S401 based on the vehicle speed SPD, which is acquired from the detection signal from the vehicle speed sensor 53. The determination value PA increases as the vehicle speed SPD increases as shown in FIG. 10. In the subsequent step S402, the ECU 92 determines if the brake pressure PBK is relatively great based on whether or not the brake pressure PBK is greater than the determination value PA.

When it is determined that the level of the brake pressure PBK is greater than the determination value PA, the ECU 92 computes the basic throttle angle TAbse in step S403 based on the basic fuel injection amount Qbse and the engine speed NE by referring to the map that is used when the brake pressure PBK is relatively great. When it is determined that the level of the brake pressure PBK is smaller than the determination value PA, the ECU 92 computes the basic throttle angle TAbse in step S404 based on the basic fuel injection amount Qbse and the engine speed NE by referring to the map that is used when the brake pressure PBK is relatively small.

After the ECU 92 performs either step S403 or step S404 to compute the basic throttle angle TAbse by referring to one of two maps, the ECU 92 temporarily terminates the basic-throttle-angle computing routine.

Figures 11A, 11B:
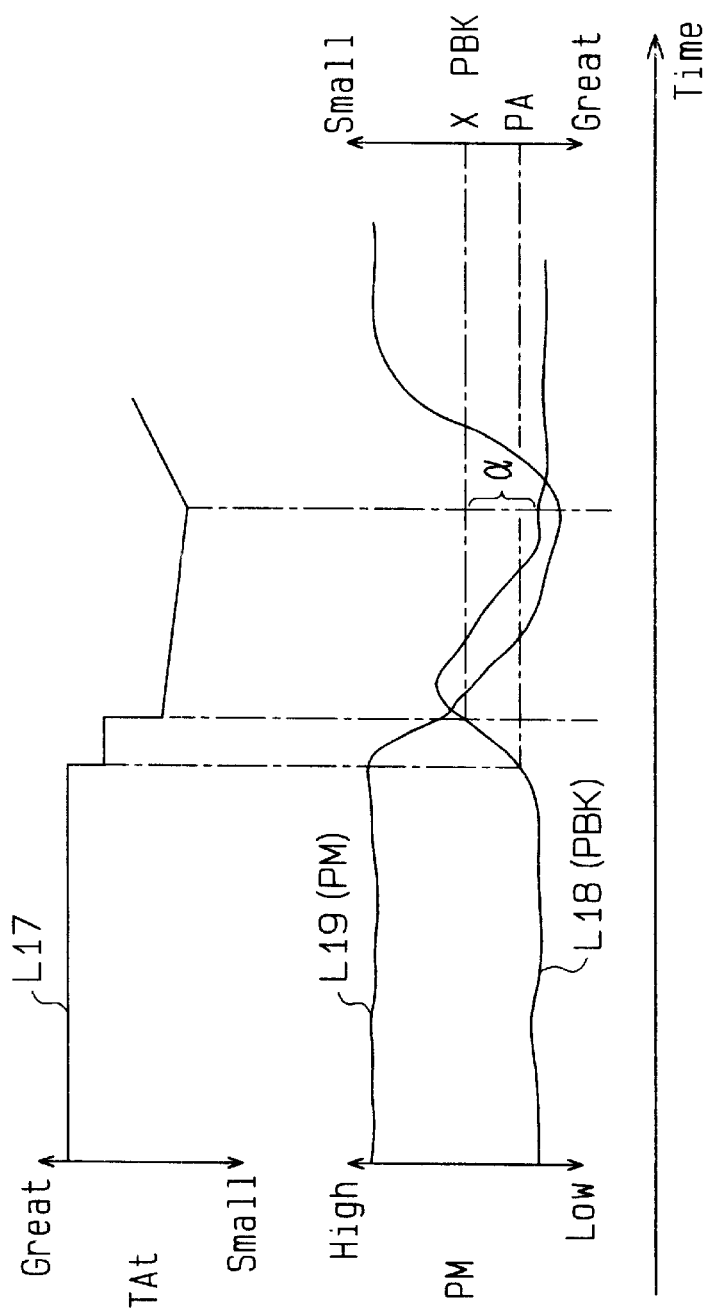
FIGS. 11(a) and 11(b) are time charts illustrating variation of intake pressure PM, a target throttle angle TAt and brake pressure PBK when choking is performed.

Controlling the throttle angle based on the brake pressure PBK will now be explained with reference to FIGS. 11(a) and 11(b). FIGS. 11(a) and 11(b) are time charts illustrating the variation of the intake pressure PM, the target throttle angle TAt and the brake pressure PBK when the throttle closing control is carried out.

When the level of the brake pressure PBK is greater than the determination value PA in the stratified charge combustion mode, the basic throttle angle TAbse is such that the throttle is relatively wide open as compared with the case where the level of the brake pressure PBK is smaller than the determination value PA, as indicated by a solid line L17 in FIG. 11(a), thus reducing the pumping loss of the engine 11. When the level of the brake pressure PBK is relatively small, the target throttle angle TAt is such that the throttle valve is relatively more closed. Thus, the basic throttle angle TAbse is set such that the required level of brake pressure PBK is quickly produced when the throttle closing control is conducted.

In the situation where the level of the brake pressure PBK is greater than the determination value PA as indicated by a solid line L18 in FIG. 11(b), when the brake pressure PBK decreases to a level less than the determination value PA in accordance with the manipulation of the brake booster 50, the target throttle angle TAt is such that the throttle valve closes, as indicated by the solid line L17 in FIG. 11(a). This is because the map for computing the basic throttle angle TAbse changes from the one used when the brake pressure PBK is relatively great to the one used when the brake pressure PBK is relatively small. As the target throttle angle TAt decreases, the intake pressure PM drops as indicated by a solid line L19 in FIG. 11(b).

When the brake pressure PBK later decreases to a level lower than the demanded value X, the throttle closing control is executed and the target throttle angle TAt varies as indicated by the solid line L17. Accordingly, the intake pressure PM falls as indicated by the solid line L19. This drop in intake pressure PM causes the brake pressure PBK to increase by the predetermined value a with respect to the demanded value X. When the throttle closing control is performed, the basic throttle angle TAbse initially corresponds to a relatively small level of the brake pressure PBK, thus reducing the time required to produce the required brake pressure PBK.

The determination value PA that is used in determining the relative level of the brake pressure PBK is set according to the vehicle speed SPD and increases as the vehicle speed SPD increases.

When the vehicle speed SPD is high (the required braking force is large) and the brake pressure PBK is constant, the relative level of the brake pressure PBK is determined to be small based on the increased determination value PA. In this case, the throttle angle control is carried out based on the basic throttle angle TAbse that corresponds to a relatively low level of the brake pressure PBK, which tends to close the throttle. Even if the activation of the brake booster 50 due to the high vehicle speed SPD causes the brake pressure PBK to fall significantly below the demanded value X, the required brake pressure PBK can be quickly produced by executing the throttle closing control.

When the vehicle speed SPD is low (the required braking force is small) and the brake pressure PBK is constant, the relative level of the brake pressure PBK is determined to be high based on the decreased determination value PA. In this case, the throttle angle control is carried out based on the basic throttle angle TAbse that corresponds to a relatively high level of the brake pressure PBK, which tends to open the throttle. This reduces the pumping loss of the engine 11 to improve the fuel efficiency.

This embodiment, which performs the processes specifically described above, has the following advantage.

The higher the vehicle speed SPD is, the greater the necessary braking force becomes. As the braking force increases, the brake pressure PBK decreases significantly when the brake booster 50 is activated. Because the relative level of the brake pressure PBK is determined using the determination value PA, which is set in accordance with the vehicle speed SPD, however, it is possible to precisely regulate the brake pressure PBK. This accurate adjustment of the brake pressure PBK improves the fuel efficiency by reducing pumping loss of the engine 11 while improving the braking performance by quickly raising the brake pressure PBK when necessary.

It should be apparent to those skilled in the art that the present invention may be embodied in many other specific forms without departing from the spirit or scope of the invention.

Although throttle angle control that reflects the atmospheric pressure is carried out by computing the basic throttle angle TAbse based on the brake pressure PBK, which is the differential pressure between the atmospheric pressure and the booster working pressure PV in the above-described embodiments, this invention is not so limited. For instance, throttle angle control that reflects the atmospheric pressure may be executed by computing the basic throttle angle TAbse based on the booster working pressure PV instead of the brake pressure PBK and by multiplying the basic throttle angle TAbse by a compensation coefficient, which is computed based on the atmospheric pressure.

In the illustrated embodiments, the demanded value X and the determination value PA are used to judge the brake pressure PBK. Like the brake pressure PBK, the values X and PA represent differences from the atmospheric pressure. Therefore, when the booster working pressure PV is used instead of the brake pressure PBK, not only in the computation of the basic throttle opening TAbse, but also in the entire procedure for controlling the throttle opening, the demanded value X and the determination value PA correspond to the booster working pressure PV and represent absolute pressures. The demanded value X and the determination value PA are preferably changed according to the atmospheric pressure such that the values X and PA have a constant difference from the atmospheric pressure.

In the illustrated embodiments, the process for judging whether the brake pressure PBK is greater than the demanded value X or than the determination value PA is equivalent to judging whether the booster working pressure PV is lower than an absolute pressure that corresponds to the demanded value X or to the determination value PA. The absolute pressure is changed in accordance with the atmospheric pressure.

The throttle angle control according to the brake pressure PBK may be performed not only when the engine 11 is operating in the stratified charge combustion mode, but also when the engine 11 is operating in another combustion mode, for example, a homogeneous lean charge combustion mode. The homogeneous lean charge combustion mode is similar to the homogeneous charge combustion mode. However, the air-fuel ratio in the homogeneous lean charge combustion mode is more lean than the air-fuel ratio in the homogeneous charge combustion mode.

Although the basic throttle angle TAbse is calculated in accordance with the relative level of the brake pressure PBK for the demanded value X such that, as the brake pressure PBK increases, the value of the basic throttle angle TAbse causes greater opening of the throttle in the first and second embodiments, this invention is not so limited. For instance, two maps for computing the basic throttle angle TAbse, one for a relatively high levels and one for relatively low levels of the brake pressure PBK may be prepared, and the current map may be selected in accordance with the current level of the brake pressure PBK, as in the third embodiment.

Although control of the throttle angle according to the level of the brake pressure PBK includes computing the basic throttle angle TAbse by referring to the map based on the brake pressure PBK, this invention is not so limited. For example, the basic throttle angle TAbse may be computed based on the basic fuel injection amount Qbse and the engine speed NE, and a compensation coefficient may be computed in accordance with the brake pressure PBK. When the target throttle angle TAt is calculated from the basic throttle angle TAbse, the basic throttle angle TAbse may be multiplied by the compensation coefficient, thus controlling the throttle angle according to the brake pressure PBK.

Although throttle angle control is carried out to regulate the intake pressure PM in accordance with the brake pressure PBK in the above-described embodiments, the intake pressure PM may be adjusted in accordance with the brake pressure PBK by controlling the EGR valve 43 instead. In this case, the target EGR angle in the stratified charge combustion mode is computed not only based on the basic fuel injection amount Qbse and the engine speed NE but also based on the brake pressure PBK. Further, the intake pressure PM may be adjusted in accordance with the brake pressure PBK by controlling both the throttle valve 23 and the EGR valve 43. When the control of the EGR valve 43 is performed based on the brake pressure PBK under the principles of the second embodiment, the EGR valve 43 may be closed by a predetermined amount, thus ensuring rapid production of the required brake pressure PBK, when the brake pedal 51 is manipulated or the brake pressure PBK falls significantly.

In the above-described embodiments, the control of not only the throttle valve 23 and the EGR valve 43 but also other things, such as the ignition timing and the fuel injection timing may also be carried out based on the brake pressure PBK. In this case, when the throttle valve 23 and EGR valve 43 are controlled based on the brake pressure PBK to regulate the intake pressure PM, those procedures may deteriorate the running conditions of the engine 11. The deterioration of the running conditions of the engine 11 can however be suppressed by carrying out the ignition timing control, fuel injection timing control, and other control procedures based on the brake pressure PBK.

In the second embodiment, one of steps S303 and S304 in the basic-throttle-angle computing routine (FIG. 7) may be omitted.

Figure 12:
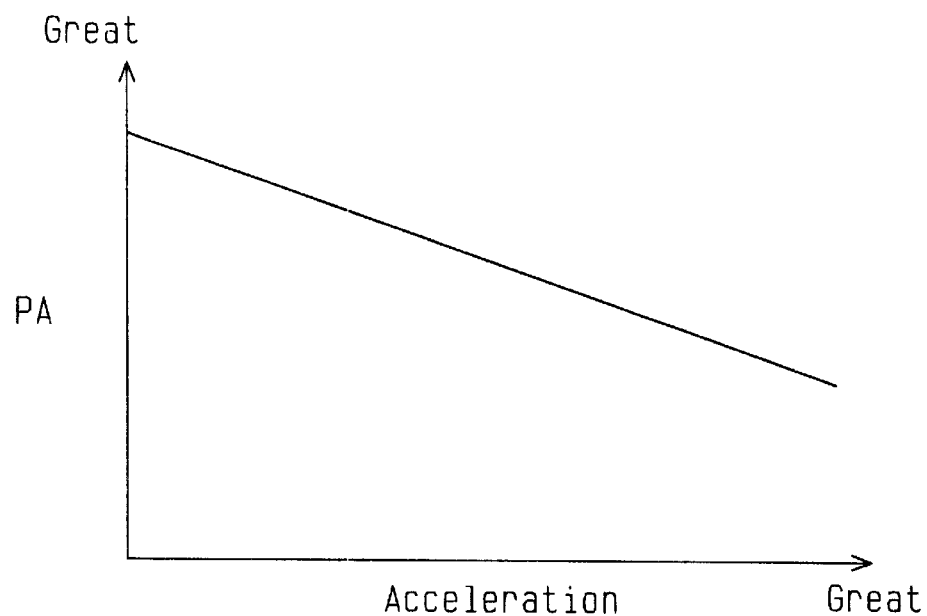
FIG. 12 is a graph showing variation of a determination value PA with respect to a change in acceleration.
Figure 13:
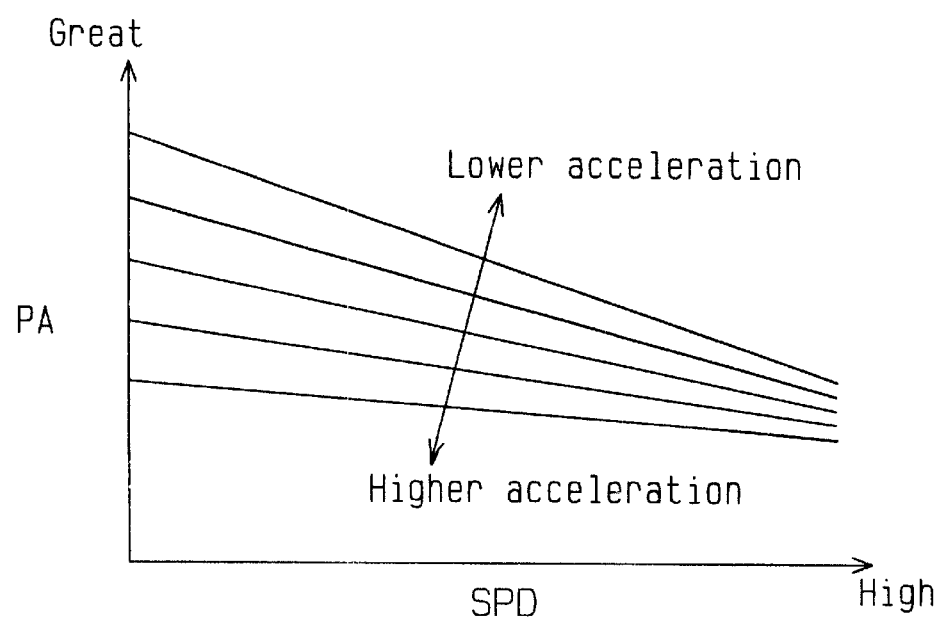
FIG. 13 is a graph showing the variation of the determination value PA with respect to a change in vehicle speed and a change in acceleration.

Although the determination value PA is set in accordance with the vehicle speed SPD, which is one of the running conditions of the vehicle in the second embodiment, the determination value PA may instead be set in accordance with the acceleration, which is another running condition of the vehicle. In this case, the determination value PA increases as the acceleration increases as shown in FIG. 12. This is because, as the acceleration increases, the required braking force also increases, when the brakes are applied at higher levels of acceleration, the resulting drop in the brake pressure PBK is greater. Further, the determination value PA may be set in accordance with both the vehicle speed SPD and the acceleration. In this case, the determination value PA increases as the vehicle speed SPD becomes higher and as the acceleration increases, as shown in, for example, FIG. 13. While the acceleration of the vehicle can be computed based on the vehicle speed SPD, it may be directly detected by using an acceleration sensor or the like.

In the second embodiment, the determination value PA, which is set in accordance with the running conditions of the vehicle, such as the vehicle speed SPD and acceleration, may be used in step S301 in the basic-throttle-angle computing routine (FIG. 7).

Therefore, the present examples and embodiments are to be considered as illustrative and not restrictive and the invention is not to be limited to the details given herein, but may be modified within the scope and equivalence of the appended claims.

What is claimed is:

1. A negative pressure control apparatus for an engine that produces power by burning a mixture of air and fuel in a combustion chamber, comprising:

an intake passage connected to the combustion chamber, wherein negative pressure is produced in the intake passage when air is drawn into the combustion chamber from the intake passage;

a negative pressure driven device actuated by a working pressure, which is produced by the negative pressure in the intake passage;

a mechanism for adjusting the pressure in the intake passage; and a controller for controlling the pressure adjusting mechanism, wherein, when the working pressure is higher than a predetermined demanded value, the controller causes the pressure adjusting mechanism to lower the pressure in the intake passage to lower the working pressure, wherein, when the working pressure is lower than the demanded value, the controller, through the pressure adjusting mechanism, raises the pressure in the intake passage as the difference between the working pressure and the demanded value increases.

2. The apparatus according to claim 1, wherein the controller determines the difference between the working pressure and the demanded value and proceeds according to the magnitude of the difference.

3. The apparatus according to claim 1, wherein the controller compares the working pressure with a determination value, which is lower than the demanded value, and wherein the controller causes the pressure adjusting mechanism to raise the pressure in the intake passage to be higher when the working pressure is below the determination value than when the working pressure is above the determination value.

4. The apparatus according to claim 3, wherein the controller changes the determination value in accordance with the running conditions of a vehicle in which the engine is installed.

5. The apparatus according to claim 4, wherein the vehicle running conditions include at least one of the vehicle speed and the vehicle acceleration.

6. The apparatus according to claim 1, wherein, when the working pressure is lower than the demanded value, the controller causes the pressure adjusting mechanism to instantly lower the pressure in the intake passage by a predetermined value if the working pressure increases.

7. The apparatus according to claim 1, wherein, when the working pressure is lower than a determination value, which is lower than the demanded value, the controller causes the pressure adjusting mechanism to instantly lower the pressure in the intake passage by a predetermined value if the working pressure increases.

8. The apparatus according to claim 1, wherein the negative pressure driven device includes a brake booster, which applies supplemental braking force to a vehicle in which the engine is installed.

9. The apparatus according to claim 8, wherein, when the working pressure is lower than the demanded value, the controller causes the pressure adjusting mechanism to instantly lower the pressure in the intake passage by a predetermined value if the brake booster is actuated.

10. The apparatus according to claim 8, wherein, when the working pressure is lower than a determination value, which is lower than the demanded value, the controller causes the pressure adjusting mechanism to instantly lower the pressure in the intake passage by a predetermined value if the brake booster is actuated.

11. The apparatus according to claim 1, wherein the controller determines the working pressure and the demanded value in consideration of the atmospheric pressure.

12. The apparatus according to claim 1, wherein the pressure adjusting mechanism includes a throttle valve located in the intake passage.

13. The apparatus according to claim 1, wherein the engine operates in a combustion mode selected from a homogeneous charge combustion mode and a stratified charge combustion mode, and wherein the controller controls the pressure adjusting mechanism in accordance with the working pressure when the engine is operating in the stratified charge combustion mode.

14. A negative pressure control apparatus for a vehicle engine that produces power by burning a mixture of air and fuel in a combustion chamber, comprising:

an intake passage connected to the combustion chamber, wherein negative pressure is produced in the intake passage when air is drawn into the combustion chamber from the intake passage;

a brake booster, wherein the brake booster is actuated by a working pressure, which is produced by the negative pressure in the intake passage, to apply supplemental braking force to the vehicle;

a throttle valve for adjusting the pressure in the intake passage by regulating a throttle opening;

a controller for controlling the throttle valve, wherein, when the working pressure is higher than a predetermined demanded value, the controller decreases the opening of the throttle valve to lower the pressure in the intake passage, and when the working pressure is lower than the demanded value, the controller increases the opening of the throttle valve as the difference between the working pressure and the demanded value increases.

15. The apparatus according to claim 14, wherein the controller determines the difference between the working pressure and the demanded value and regulates the throttle valve according to the magnitude of the difference.

16. The apparatus according to claim 14, wherein the controller compares the working pressure with a determination value, which is lower than the demanded value, and wherein the controller regulates the throttle valve such that the throttle opening is wider when the working pressure is below the determination value than when the working pressure is above the determination value.

17. The apparatus according to claim 16, wherein the controller changes the determination value in accordance with the running conditions of the vehicle.

18. The apparatus according to claim 17, wherein the vehicle running conditions include at least one of the vehicle speed and the vehicle acceleration.

19. The apparatus according to claim 14, wherein, when the working pressure is lower than a determination value, which is lower than the demanded value, the controller instantly decreases the opening of the throttle valve by a predetermined value if the working pressure increases.

20. The apparatus according to claim 14, wherein, when the working pressure is lower than a determination value, which is lower than the demanded value, the controller instantly decreases the opening of the throttle valve by a predetermined value if the brake booster is actuated.

21. The apparatus according to claim 14, wherein the controller determines the working pressure and the demanded value in consideration of the atmospheric pressure.

22. A method for controlling negative pressure of an engine, wherein the engine produces power by burning a mixture of air and fuel in a combustion chamber, the method comprising:

producing negative pressure in an intake passage when air is drawn into the combustion chamber from the intake passage;

actuating a negative pressure driven device by a working pressure, which is produced by the negative pressure in the intake passage;

lowering the pressure in the intake passage and the working pressure when the working pressure is higher than a predetermined demanded value; and increasing the pressure in the intake passage as the difference between the working pressure and the demanded value increases when the working pressure is lower than the demanded value.

* * * * *